United States Patent [19]

Cleary et al.

[11] Patent Number: 5,616,364
[45] Date of Patent: Apr. 1, 1997

[54] AQUEOUS COMPOSITIONS USEFUL AS PRINTING VEHICLES

[75] Inventors: Brenda A. Cleary, Sellersville; Steven P. Boucher, Hatfield, both of Pa.

[73] Assignee: Henkel Corporation, Plymouth Meeting, Pa.

[21] Appl. No.: 206,556

[22] Filed: Mar. 2, 1994

Related U.S. Application Data

[63] Continuation-in-part of Ser. No. 126,281, Sep. 24, 1993, abandoned.

[51] Int. Cl.$^6$ ............................................................ B05D 3/02
[52] U.S. Cl. ........................... 427/389.9; 427/288; 427/391
[58] Field of Search ........................... 524/460; 427/389.9, 427/288, 391

[56] References Cited

U.S. PATENT DOCUMENTS

| | | | |
|---|---|---|---|
| 4,148,779 | 4/1979 | Blackwell et al. | 260/40 |
| 4,150,005 | 4/1979 | Gehman et al. | 524/460 |
| 4,230,613 | 10/1980 | Wolinski et al. | 156/315 |
| 4,814,373 | 3/1989 | Frankel et al. | 524/160 |
| 4,921,899 | 5/1990 | Phan et al. | 524/513 |
| 5,075,364 | 12/1991 | Phan et al. | 524/190 |
| 5,196,470 | 3/1993 | Anderson et al. | 524/379 |
| 5,306,743 | 4/1994 | Klesse et al. | 523/201 |
| 5,356,956 | 10/1994 | Uemae et al. | 524/460 X |

OTHER PUBLICATIONS

B. Kine, "Acrylic and Methacrylic Ester Polymers", *Encyclopedia of Polymer Science and Engineering*, vol. 1, pp. 234–305 (John Wiley & Sons, Inc. N.Y., N.Y., 1985).

"Pressure Sensitiver Adhesives", *Encyclopedia of Polymer Science and Engineering*, vol. 13, pp. 353–355; T. Sulzberg, Printing Ink Vehicles, vol. 13, pp. 368–398, (John Wiley & Sons, Inc. N.Y., N.Y., 1985).

G. Poehlein, "Emulsion Polymerization", *Encyclopedia of Polymer Science and Engineering*, vol. 6, pp. 1–51 (John Wiley & Sons, Inc. N.Y., N.Y., 1986).

D. James, "Styrene Polymers", *Encyclopedia of Polymer Science and Engineering*, vol. 16, pp. 1–21 (John Wiley & Sons, Inc., N.Y., N.Y., 1989).

J. Lowell, "Coating Methods", *Encyclopedia of Polymer Science and Engineering*, vol. 3, pp. 553–671 and supp. vol., pp. 53, 109 and 110 (John Wiley & Sons, Inc., N.Y., N.Y., 1985).

G–CRYL®, General Product Information Bulletin, Henkel Corporation Coatings and Inks, Jan. 1993.

Technical Information Sheet on G–CRYL®, Henkel Corporation, 1993.

*Primary Examiner*—Judy M. Reddick
*Attorney, Agent, or Firm*—Wayne C. Jaeschke; John Daniel Wood; Daniel S. Ortiz

[57] ABSTRACT

Provided are aqueous dispersion consisting essentially of high-molecular weight polymer prepared by aqueous suspension polymerizing a blend of monomers, said blend consisting essentially of: (i) a plasticizing amount by weight of a monomer selected from the group consisting of plasticizing alkyl acrylate monomers and mixtures thereof, (ii) a hardening amount by weight of a monomer selected from the group consisting of hardening alkyl acrylate monomers and mixtures thereof, and (iii) a crosslinking amount by weight of a monomer selected from the group consisting of di-ethylenically unsaturated monomers and mixtures thereof, in an aqueous suspension comprising a polymer component consisting essentially of a low-molecular weight, water-soluble, acrylic polymer having carboxylate functionality. Also provided is a method of coating a substrate comprising (i) contacting a surface of a substrate with an aqueous dispersion composition comprising an aqueous dispersion as defined above, and (ii) drying said surface to form a film of said polymer in contact with said surface. In preferred methods, said polymer in aqueous dispersion is supplied to said surface by a hydrophilic cylindrical transfer roll. These polymers are particularly useful as the binder for an ink composition, or an overprint varnish, having good wet block resistance.

17 Claims, No Drawings

AQUEOUS COMPOSITIONS USEFUL AS PRINTING VEHICLES

CROSS-REFERENCE TO RELATED APPLICATIONS

This application is a continuation-in-part of U.S. Ser. No. 08/126,281, filed Sep. 24, 1993, now abandoned, the disclosure of which is incorporated by reference herein.

FIELD OF THE INVENTION

The present invention relates to aqueous compositions of copolymers and to their use as printing vehicles. More particularly, it relates to alkyl acrylate copolymers and their use in printing inks or varnishes particularly suited for use flexographic or gravure printing processes.

BACKGROUND OF THE INVENTION

Alkyl acrylate and methacrylate polymers are generally known in the art. see e.g. "Acrylic and Methacrylic Ester Polymers", *Encyclopedia of Polymer Science and Engineering*, vol. 1, pp. 236–299 (John Wiley & Sons, Inc. New York, N.Y., 1985). For example, the effect of the choice of alkyl group on the chemical and mechanical properties of homopolymers of the alkyl acrylate and methacrylate monomers is discussed at pages 256–261. At page 258, the regulation of the glass transition temperature of copolymers (by controlling the weight fraction of the monomers)is discussed and it is noted that acrylates with low transition temperatures are often used as plasticizers for harder copolymerizable monomers, often methacrylates.

U.S. Pat. No. 4,814,373 (Frankel et al.) discloses modified aqueous dispersions of water-insoluble latex polymer prepared by swelling an initial water-insoluble latex polymer, prepared by emulsion polymerization, with additional ethylenically unsaturated monomer, including at least one monomer with two or more sites of ethylenic unsaturation, and subsequently polymerizing the additional monomer within the swollen latex particles. The modified latex polymer yields films which are useful as binders for coatings for leather and polyurethane foam and other substrates, and which show improved toughness, hardness and tensile strength while retaining substantial extensibility.

Acrylate and methacrylate ester polymers are known to have a wide variety of uses. The use of higher alkyl esters of acrylic acid as single-component pressure-sensitive adhesives is discussed in "Pressure-Sensitive Adhesives", *Encyclopedia of Polymer Science and Engineering*, vol. 13, pp. 353–355 (John Wiley & Sons, Inc. New York, N.Y., 1988), It is stated that the predominant raw materials are the butyl and 2-ethylhexyl esters of acrylic acid. One formulation for a general purpose pressure-sensitive adhesive is a copolymer of 97% by weight 2-ethylhexyl acrylate and 3% by weight of acrylic acid. Another formulation is a copolymer of 63% by weight 2-ethylhexyl acrylate and 30% by weight of vinyl acetate and 2% by weight acrylamide.

The use of acrylic ester polymers as binders is also known. For example, U.S. Pat. No. 5,196,470 (Anderson et al.) discloses an alcohol based, water soluble binder composition for nonwoven material made from water swellable, water soluble or water sensitive fibers and related substances is provided comprising a substantially anhydrous solution of an acrylic polymeric resin, and an alcohol diluent. The resin is a synthetic polymer which may be synthesized from an acrylic acid ester, methacrylic acid ester, or both, in combination with a polymerizable alpha, beta ethylenically unsaturated carboxylic acid.

U.S. Pat. No. 4,230,613 (Wolinski et al.) discloses a lacquer composition for coating a substrate, comprising acrylic polymers such as methyl methacrylate/butyl acrylate/acrylic acid terpolymers, a volatile solvent such as a mixture of toluene and isopropanol, and a tertiary amine activator.

The use of acrylate ester polymers as printing ink vehicles is generally discussed in "Printing Ink Vehicles", *Encyclopedia of Polymer Science and Engineering*, vol. 13, pp. 368–398 (John Wiley & Sons, Inc. New York, N.Y., 1988). For example, at page 393, it is stated that while acrylic and methacrylic ester resins are used in water-based systems, several problems still exist, for example balancing water solubility in the ink and water resistance in the end product.

U.S. Pat. No. 4,921,899 discloses an ink composition containing a blend of a polyester, an acrylic polymer and a vinyl polymer. The water-based inks containing the blend of these polymers as a binder can significantly improve ink film properties such as alcohol resistance, block resistance and water resistance as compared to use of water-dispersible polyester alone. The polymer blends were also employed to prepare ink primers and overprint varnishes. It is stated that these polymer blends were prepared by mixing an aqueous polyester dispersion with an acrylic emulsion which contains surfactants and other additives and that the presence of surfactants in the ink formulations creates several problems related to ink stability, printing process and print quality of the ink film.

U.S. Pat. No. 5,075,364 (Phan et. al.) discloses a blend of a water-dissipatable polyester material, an acrylic polymer and a water-dissipatable vinyl polymer. It is stated that the acrylic polymer and the vinyl polymer must be compatible with the polyester which has a particular composition. It is stated that the polymer blends are useful for preparing ink compositions having improved block resistance, water resistance, and alcohol resistance.

Summary of the Invention

This invention relates to an aqueous dispersion consisting essentially of a high-molecular weight polymer prepared by aqueous suspension polymerizing a blend of monomers, said blend consisting essentially of (i) a plasticizing amount by weight of a monomer selected from the group consisting of plasticizing alkyl acrylate monomers and mixtures thereof, (ii) a hardening amount by weight of a monomer selected from the group consisting of hardening alkyl acrylate monomers and mixtures thereof, and (iii) a crosslinking amount by weight of a monomer selected from the group consisting of di-ethylenically unsaturated crosslinking monomers and mixtures thereof, in an aqueous suspension comprising a polymer component consisting essentially of a low-molecular weight, water-soluble, acrylic polymer having carboxylate functionality. In preferred embodiments, the blend of monomers consists essentially of plasticizing monomers in an amount from about 50% to about 60% by weight, hardening monomers in an amount from about 40% to about 50% by weight, and a crosslinking monomer in an amount from about 0.1% to about 5% by weight, and the polymer has a molecular weight of from about 150,000 to about 300,000.

This invention also relates to a method of coating a substrate comprising (i) contacting a surface of a substrate with a composition comprising an aqueous dispersion as defined above, and (ii) drying said surface to form a film in contact with said surface. In preferred methods, said polymer in aqueous dispersion is supplied to said surface by a hydrophilic cylindrical transfer roll.

DETAILED DESCRIPTION OF THE INVENTION

This invention relates to novel aqueous dispersions of polymers, e.g. polymers having the formula set forth above, to printing ink vehicles which contain these novel aqueous suspensions, and to methods which employ these novel aqueous suspensions. The polymers prepared by suspension polymerization are at least copolymers of two different alkyl acrylates and/or methacrylates and a multi-ethylenic compound. Thus, important starting materials for preparing the novel polymers of this invention are alkyl esters of acrylic acid and methacrylic acid. Such esters are described in "Acrylic and Methacrylic Ester Polymers", *Encyclopedia of Polymer Science and Engineering*, vol. 1, pp. 234–299 (John Wiley & Sons, Inc., New York, N.Y., 1985), the disclosures of which are incorporated herein by reference. The precise identity of each monomer and the amount of each monomer affect properties of the polymer which are important to its utility in a printing ink vehicle.

A measure of the plasticizing effect of a monomer can be found by examining the glass transition temperature of a homopolymer of the monomer. Generally, a plasticizing monomer will be such that a homopolymer of the monomer will exhibit a glass transition temperature ($T_g$) of less than about −30° C. Thus, acrylates of a straight chain alkyl group having from 3 to 11 carbon atoms or a branched chain alkyl group having from 5 to 11 carbon atoms will generally be useful for plasticizing the polymer. Examples of such acrylate esters that will be useful include the n-propyl, n-butyl, isobutyl, n-hexyl, 2-ethylbutyl, 2-heptyl, and 2-ethylhexyl. (Because of the relatively high $T_g$ of poly(t-butyl acrylate), the use of a monomer t-butyl acrylate is unlikely to be advantageous.)

The other alkyl acrylate or methacrylate monomer is a hardening monomer. As discussed above, a measure of the hardening effect of the monomer can be found by examining the glass transition temperature of a homopolymer of the monomer. Generally, the monomer will be selected such that a homopolymer of the monomer will exhibit a glass transition temperature ($T_g$) of greater than about 50° C. Thus, methacrylates having short chain alkyl groups, e.g. 1 to about 4 carbon atoms, e.g. branched chain alkyl groups having from 3 or 4 carbon atoms, will generally be useful for hardening the polymer. Examples of alkyl methacrylates that will be useful include methyl, ethyl, isopropyl, sec-butyl, isobutyl, and t-butyl. Typically, the polymer will be prepared from a blend comprised of from about 35% to about 55% by weight (and preferably from about 40% to about 50%) of one or more hardening monomers.

In addition to mono-ethylenically unsaturated monomers, the blend from which the polymer is prepared will also be comprised of an ethylenically unsaturated monomer having at least two sites of ethylenic unsaturation, i.e. a di- or higher multi-ethylenically unsaturated monomer. Examples of multi-ethylenic monomers include urethane oligomer diacrylate alkenyl acrylates or methacrylates (e.g. allyl methacrylate), di-alkenyl arenes, particularly dialkenyl benzenes (e.g. divinyl benzene), di-alkenyl ethers (e.g. ethylene glycol di-allyl ether and pentaerythritol di-allyl ether), di-acrylamides (e.g. methylene-bis-acrylamide, trimethylene-bis-acrylamide, hexamethylene-bis-acrylamide, N,N'-diacryloylpiperazine, m-phenylene-bis-acrylamide, and p-phenylene-bis-acrylamide), di- or higher multi-acrylates (e.g. diethylene glycol diacrylate, propylene glycol dimethacrylate, diethylene glycol diacrylate, polyethylene glycol diacrylate, bis(4-acryloxypolyethoxyphenyl)propane, 1,5-pentanediol diacrylate, neopentyl glycol diacrylate, 1,6-hexanediol acrylate, and polypropylene glycol diacrylate, pentaerythritol triacrylate, trimethylolpropane triacrylate, pentaerythritol tetraacrylate, triethylene glycol, and dimethacrylate).

It is the multi-ethylenic monomer that is believed to be responsible for the enhanced wet block resistance of films of the polymer. It should be noted, however that enhanced wet block resistance is only one facet of the important properties of the polymer and that flexibility of the polymer and stability of the polymer emulsion in an aqueous medium is important as well. If the polymer is crosslinked to an excessive degree, it will not be sufficiently susceptible to emulsion and observable polymer coagulum may form in the emulsion during either the polymerization or the intended shelf life of the aqueous emulsion or printing vehicle prepared therefrom. Further, excessive crosslinking may make the polymer too brittle for the intended application. Therefore, the amount of the multi-ethylenic monomer should be adjusted to obtain the desired degrees of both wet block resistance on the one hand and polymer flexibility and emulsion stability on the other. This amount will generally be a minor amount, e.g. from about 0.01% to less than about 5% by weight of the polymer, preferably from about 0.05% to about 3%, and more preferably from about 0.5% to about 2.0%. However, the amount of the multi-ethylenic monomer should be adjusted to obtain levels of wet block resistance, polymer flexibility, and emulsion stability that are optimal for a given ink composition. Thus, the precise characteristics desired of the aqueous emulsion and the polymer film prepared therefrom will influence the determination of what is an optimal amount of the multi-ethylenic monomer for a given ink composition.

Further, while the polymer is preferably prepared from only the monomers described above without additional comonomers, other monoethylenically unsaturated polymerizable monomers may be useful in minor proportion (e.g. less than 10% by weight of the total monomer composition) as comonomers, particularly for uses other than in ink vehicles. These monomers include the vinylidene halides, vinyl halides, acrylonitrile, methacrylonitrile, vinyl esters such as vinyl formate, vinyl acetate and vinyl propionate, and mixtures of ethylene and such vinyl esters, acrylic and methacrylic acid esters of alcohol ethers such as diethylene glycol monoethyl or monobutyl ether methacrylate, $C_1$–$C_{10}$alkyl esters of beta-acryloxypropionic acid and higher oligomers of acrylic acid, styrene and alkyl substituted styrenes and vinyl aromatics including alpha-methyl styrene, mixtures of ethylene and other alkylolefins such as propylene, butylene, pentene and the like, vinyl ethers such as methyl vinyl ether, ethyl vinyl ether, vinyl 2-methoxyethyl ether, vinyl 2-chloroethyl ether and the like. Examples of alkyl acrylate and/or alkyl methacrylate esters that may be also be useful include methyl, ethyl, isopropyl, sec-butyl, n-amyl, isoamyl, t-amyl, cyclohexyl, n-octyl, n-decyl, and n-undecyl.

Additional monoethylenically unsaturated polymerizable comonomers that may be useful in preparing the polymer of the invention include hydroxy functional vinyl monomers such as 2-hydroxyethyl methacrylate, 2-hydroxyethyl acrylate, 3-hydroxypropyl methacrylate, butanediol acrylate, 3-chloro-2-hydroxypropyl acrylate, 2-hydroxypropyl acrylate, and 2-hydroxypropyl methacrylate. Further examples of useful monomers include the partial esters of unsaturated aliphatic dicarboxylic acids and particularly the alkyl half esters of such acids. Examples of such partial esters are the alkyl half esters of itaconic acid, fumaric acid and maleic acid wherein the alkyl group contains 1 to 6 carbon atoms. Representative members of this group of compounds include methyl acid itaconic, butyl acid itaconic, ethyl acid fumarate, butyl acid fumarate, and methyl acid maleate. Minor amounts of other comonomers, such as adhesion promoting comonomers, may also be used. These monomers may be copolymerized with acrylic monomers to yield the polymer.

Examples of alpha, beta-ethylenically unsaturated carboxylic acids which may also be useful as comonomers to prepare the polymer of the invention include acrylic acid, beta-acryloxypropionic acid and higher oligomers of acrylic acid and mixtures thereof, methacrylic acid, itaconic acid, aconitic acid, crotonic acid, citraconic acid, maleic acid, fumaric acid, alpha-chloroacrylic acid, cinnamic acid, mesaconic acid and mixtures thereof. In preferred embodiments, the polymer is prepared by emulsion polymerization of monomers comprising:

(a) a major amount by weight (e.g. from about 50% to about 60% by weight, based on the total weight of the polymer) of a plasticizing alkyl acrylate monomer, said alkyl being a straight chain alkyl group having from 3 to 11 carbon atoms or a branched chain alkyl group having from 5 to 11 carbon atoms, (b) a minor amount by weight (e.g. from about 40% to 50% percent by weight, based on the total weight of the polymer) of alkyl methacrylates, said alkyl groups being selected from the group consisting of methyl, ethyl, isopropyl, sec-butyl, isobutyl, and t-butyl, and (c) a nominal amount by weight (e.g. from about 0.1% to 1.0% percent by percent by weight, based on the total weight of the polymer) of a multi-ethylenically unsaturated monomer, in the presence of a styrene/acrylic copolymer having carboxylate functionality, a molecular weight of from about 4,000 to about 12,000, and an acid number of from about 150 to 250, the weight ratio of said styrene/acrylic copolymer to said high molecular weight polymer being from about 1.0:1 to about 1.5:1.

The preparation of aqueous dispersions of polymers by emulsion polymerization for use in coatings applications is well known in the art. The practice of emulsion polymerization is discussed in detail in G. Poehlein, "Emulsion Polymerization ", *Encyclopedia of Polymer Science and Technology*, vol. 6, pp. 1–51 (John Wiley & Sons, Inc. New York, N.Y., 1986), the disclosure of which is incorporated herein by reference. Conventional emulsion polymerization techniques may be used to prepare the aqueous dispersion of polymers of this invention.

The emulsion will contain a low-molecular weight, water-soluble, acrylic polymer having carboxylate functionality. These carboxylate polymer resins are of low molecular weight, e.g. from about 4,000 to about 12,000, as compared to the polymer prepared by the emulsion polymerization. The amount of the low-molecular weight, water-soluble, acrylic polymer can vary broadly, depending upon the precise properties desired in the emulsion and the resulting film, as discussed below. Typically, however, the amount of low-molecular weight, water-soluble, acrylic polymer will be a minor amount as compared to the amount of the high molecular weight polymer, and is preferably in a ratio of from about 5:1 to about 1.5:1, by weight. In particularly preferred embodiments, the weight ratio of the low-molecular weight, water-soluble, acrylic polymer to the high molecular weight polymer will be from about 4.0:1 to about 2.0:1 and more preferably from about 3.0:1 to about 2.5:1.

One of the functions of this polymer is as a suspending aid, and thus, the polymer will have sufficient carboxylate functionality to be stably dispersed in the aqueous polymerization medium. Such resins become and contribute to the polymer film prepared from the emulsion, but do not have acceptable film properties by themselves. Such resins do, however, affect various properties of the emulsion and films prepared therefrom, e.g. the resolubility of the polymer blend in the ink vehicle. Preferred compositions contain an acrylic resin having a water-solubility sufficient to impart the desired degree of resolubility to the polymers of the ink or varnish, as discussed below. By "resolubility" is meant that the polymer will redisperse in the ink vehicle while still in a wet state so that there will not be an unacceptable build up of the polymer on a transfer roll used to apply the polymer to a substrate. For example, in an ink composition or with a printing apparatus that is relatively more susceptible to deposition of polymer on the transfer rolls, it may be desirable to employ a suspending aid polymer with a relatively higher acid number. Use of such a polymer may tend to increase the hydrophilicity of a film of the polymer (and, thus, exacerbate any wet block problems), but should improve the resolubility of the polymer in the ink or varnish, and thus, tend to prevent deposition of the polymer on a transfer rolls used to apply the ink or varnish to a printing substrate. Conversely, if resolubility is not as important a factor for a given ink composition or varnish, or for a given printing apparatus, it may be desirable to minimize the acid number of the suspending aid resin and, thus, reduce the hydrophilicity of the film.

Preferred carboxylate polymers are vinyl aromatic/acrylic copolymers having a substantial acid number (typically 150–250, and preferably 180–220) and a moderate molecular weight (e.g. 6,000 to 10,000). Vinyl aromatic compounds are discussed in "Styrene Polymers" *Encyclopedia of Polymer Science and Engineering*, vol. 16, pp. 1–21 (John Wiley & Sons, Inc., New York, N.Y., 1989), the disclosure of which is incorporated herein by reference. The vinyl aromatic compounds comprise monovinyl aromatic hydrocarbons containing from 8 to 12 carbon atoms and halogenated derivatives thereof having halo-substituted aromatic moieties. Examples include styrene, alpha-methylstyrene, vinyl toluene (e.g. a 60/40 mixture by weight of meta-methylstyrene and para-methylstyrene), meta-methylstyrene, para-methylstyrene, para-ethylstyrene, para-n-propylstyrene, para-isopropylstyrene, para-tert-butylstyrene, ortho-chlorostyrene, para-chlorostyrene, alpha-methyl-meta-methylstyrene, alpha-methyl-para-methylstyrene, tert-butyl styrene, alpha-methyl-ortho-chlorostyrene, and alpha-methyl-para-chlorostyrene.

At least a portion of the acrylic units of the polymer will bear free carboxyl or carboxylate groups (the carboxyl or carboxylate form depending upon the pH of the aqueous emulsion). This carboxylate functionality is solvated by the aqueous polymerization medium and, thus, contributes to the stability of the polymer suspension. The aqueous composition should be essentially free of species which can react with or form a complex with such carboxylate functionality. Such freedom will ensure that the carboxylate functionality remains solvated by the aqueous polymerization medium and/or that the carboxylate polymer will not engage in measurable crosslinking, either in the aqueous polymerization medium or the films prepared therewith. The monomers may be emulsified with an anionic, cationic or nonionic dispersing agent, using for example from about 0.05% % to 10% by weight of dispersing agent on the weight of total monomers. Combinations of anionic and nonionic emulsifiers may also be used. High molecular weight polymers such as hydroxy ethyl cellulose, methyl cellulose and polyvinyl alcohol may be used as emulsion stabilizers and protective colloids, as may polyelectrolytes such as polyacrylic acid.

Cationic dispersion agents include lauryl-pyridinium chlorides, cetyldimethyl amine acetate, and alkyldimethylbenzylammonium chlorides in which the alkyl group has from 8 to 18 carbon atoms. Anionic dispersing agents include, for example, the higher fatty alcohol sulfates, such as sodium lauryl sulfate, and the like; alkylaryl sulfonates such as sodium or potassium isopropylbenzene sulfonates or isopropyl napththalene sulfonates, and the like; alkali metal higher alkyl sulfosuccinates, such as sodium octyl sulfosuccinate, sodium N-methyl-N-palmitoyltaurate, sodium oleyl isothionate, and the like; and alkali metal salts of alkylarylpolyethoxyethanol sulfates or sulfonates, such as sodium tert-octylphenoxypolyethoxyethyl sulfate having 1 to 5 oxyethylene units, and the like.

Suitable non-ionic dispersing agents include alkylphenoxypolyethoxyethanols having alkyl groups of from about 7 to 18 carbon atoms and from about 6 to about 60 oxyethylene units, such as heptylphenoxypolyethoxyethanols, methyloctylphenoxypolyethoxyethanols, and the like; polyethoxyethanol derivatives of methylene-linked alkyl phenols; sulfur-containing agents such as those made by condensing from about 6 to about 60 moles of ethylene oxide with nonyl mercaptan, dodecyl mercaptan, and the like, or with alkylthiophenols wherein the alkyl groups contain from 6 to 16 carbon atoms; ethylene oxide derivatives of long-chained carboxylic acids, such as lauric acid, myristic acid, palmitic acid, oleic acid, and the like, or mixtures of acids such as those found in tall oil containing from 6 to 60 oxethylene units per molecule; analogous ethylene oxide condensates of long-chained alcohols such as octyl, decyl, lauryl, or cetyl alcohols, ethylene oxide derivative of etherified or esterified polyhydroxy compounds having a hydrophobic hydrocarbon chain, such as sorbitan monostearate containing from 6 to 60 oxethylene units; also, ethylene oxide condensates of long-chain or branched chain amines, such as dodecyl amine, hexadecyl amine, and octadecyl amine, containing from 6 to 60 oxyethylene units; block copolymers of ethylene oxide sections combined with one or more hydrophobic propylene oxide sections. Mixtures of alkyl benzenesulfonates and ethoxylated alkylphenols may be employed.

Also, emulsion stabilizers, i.e. water soluble polymers such as water-soluble polyalkylene oxides, may be useful. A preferred emulsion stabilizer is a polypropylene glycol having a molecular weight in the range of 1,000 to 1,500.

A polymerization initiator of the free radical type, such as ammonium or potassium persulfate, may be used alone or as the oxidizing component of a redox system, which also includes a reducing component such as potassium metabisulfite, sodium thiosulfate or sodium formaldehyde sulfoxylate. The reducing component is frequently referred to as an accelerator. The initiator and accelerator, commonly referred to as catalyst, catalyst system or redox system, may be used in proportion from about 0.01% or less to 3% each, based on the weight of monomers to be copolymerized. Examples of redox catalyst systems include t-butyl hydroperoxide/sodium formaldehyde sulfoxylate/Fe(II), and ammonium persulfate/sodium bisulfite/sodium hydrosulfite/Fe(II). The polymerization temperature may be from room temperature to 90° C., or more, and may be optimized for the catalyst system employed, as is conventional. Emulsion polymerization may be seeded or unseeded. Seeded polymerization is preferred and tends to yield aqueous dispersions of latex polymer having more uniform physical properties than unseeded polymerization.

Chain transfer agents including mercaptans, polymercaptans and polyhalogen compounds are sometimes desirable in the polymerization mixture to moderate polymer molecular weight. Examples of chain transfer agents which may be used include long chain alkyl mercaptans such as t-dodecyl mercaptans, alcohols such as isopropanol, isobutanol, lauryl alcohol or t-octyl alcohol, carbon tetrachloride, tetrachloroethylene and trichlorobromoethane. Generally from about 0 to 3% by weight, based on the weight of the monomer mixture, may be used.

The polymerization process may be a thermal or redox type; that is, free radicals may be generated solely by the thermal dissociation of an initiator species or a redox system may be used. A monomer emulsion containing all or some portion of the monomers to be polymerized may be prepared using the monomers, water and emulsifiers. A catalyst solution containing catalyst in water may be separately prepared. The monomer emulsion and catalyst solution may be co-fed into the polymerization vessel over the course of the emulsion polymerization. The reaction vessel itself may initially contain water. The reaction vessel may also additionally contain seed emulsion and further may additionally contain an initial charge of polymerization catalyst. The temperature of the reaction vessel during the emulsion polymerization may be controlled by cooling to remove heat generated by the polymerization reaction or by heating the reaction vessel. Several monomer emulsions may be simultaneously co-fed into the reaction vessel. When multiple monomer emulsions are co-fed, they may be of different monomer composition. The sequence and rates at which the diverse monomer emulsions are co-fed may be altered during the emulsion polymerization process. After addition of the monomer emulsion or emulsions has been completed, the polymerization reaction mixture may be chased (e.g. with t-butyl hydroperoxide and or sodium ascorbate) to minimize the concentrations of unreacted monomer and unreacted polymerization catalyst species. The pH of the contents of the reaction vessel may also be altered during the course of the emulsion polymerization process. Both thermal and redox polymerization processes may be employed.

While the preferred use of the preferred polymers of this invention is in a printing ink vehicle, e.g. as a binder resin or a varnish, the polymer can be used in a wide variety of end-use applications. For example, it can be used in leather finishes and coatings, clear and pigmented coatings for wood and other architectural substrates, caulks, and sealants and as a binder for an exterior coating composition, such as those used to protect sprayed-in-place polyurethane foam roofing (roof mastics).

Because of the excellent film forming capabilities of the polymer, the polymer can be used in coating in general. The aqueous dispersions of the present invention can, thus, be applied to a variety of substrates to form a coating thereon. These substrates include, for example, porous stock such as paper and cardboard, wood and wood products, metals such as aluminum, copper, steel, and plastics e.g. films such as polyolefins (low density polyethylene, linear low density polyethylene, polypropylene), polyesters, (e.g. polyethylene terephthalate), polyamides, polycarbonates, acrylics and the like. The compositions are applied by methods such as spraying, rollcoating, flexo and gravure processes onto a selected substrate. The resulting coated substrate is typically allowed to dry before further processing.

The coating compositions may optionally include other substances such as pigments, resins, monomers and additives such as anti-oxidants and rheological modifiers. Methods of coating and materials used in coatings are described in *Encyclopedia of Polymer Science and Engineering*, vol. 3, pp. 552–671 and supp. vol., pp. 53, 109 and 110 (John Wiley & Sons, Inc., New York, N.Y., 1985), the disclosure of which is incorporated by reference.

The ink and varnish compositions of this invention can be for any of the typical ink or varnish applications such as flexographic, gravure, letterpress, ink-jet, or screen-process printing applications. The ink compositions of the present invention have excellent adhesion to a wide variety of substrates including plastic films such as polyester, polyethylene or polypropylene, aluminum foil, glass, and paper. The ink and varnish compositions of the present invention should have a pH greater than 8, e.g. typically 8.2 to 9.0.

The aqueous emulsions of this invention are particularly useful in preparing inks or varnishes that are, in turn, particularly useful in the printing of non-woven cellulosic substrates. Such substrates are sheets or other continuous webs of cellulosic fibers formed by deposition of the fibers from a suspension in such a way that the fibers are intermeshed to form a thin but compact whole. Thus, the preferred substrates can be characterized as paper. Examples of paper stocks include letter stock, bag stock, carton stock, newsprint, and so on. The inks and vanishes of this invention are particularly useful in printing packaging papers, such as bag stock and carton stock.

The printing processes most advantageously used with the inks or varnishes are the flexographic and/or gravure printing processes. One characteristic of such printing processes, is that the aqueous dispersion of ink or varnish is supplied to said surface by a hydrophilic cylindrical transfer roll. Printing processes are described by T. Sulzberg et al., "Printing Ink Vehicles", *Encyclopedia of Polymer Science and Engineering*, vol. 13, pp. 368–398 (John Wiley & Sons, Inc., New York, N.Y., 1988), the disclosure of which is incorporated herein by reference. Thus, this invention relates to a method of printing comprising applying a first portion of an aqueous dispersion comprised of the polymer of this invention to a first essentially impervious printing surface, said surface having recesses therein which define a resolvable image, contacting said surface with a printable substrate, and repeating said applying and said contacting with a second portion of said aqueous dispersion and a second printable surface. This method may be a letterpress printing method (wherein said recesses define raised portions of the surface which carry the aqueous dispersion to the substrate, e.g. flexography) or a gravure printing method (wherein said recesses carry the aqueous dispersion to the substrate). In flexographic printing in particular, an aqueous dispersion comprised of the polymer of this invention is applied to a flexible plate mounted on a plate cylinder. The flexible plate is then contacted with a printable substrate by rotation of the plate cylinder. In preferred embodiments, the aqueous dispersion is applied to the flexible plate with a hydrophilic cylindrical transfer roll which is rotated to successively take up and then apply successive portions of the aqueous dispersion.

The inks, overprints, and primers of this invention can be prepared, for example, as disclosed in U.S. Pat. No. 4,148,779, which is incorporated herein by reference in its entirety. For example, the printing ink, overprint, or primer may be prepared as follows. The colorant is added to the polymer blend dispersion and, at a properly adjusted viscosity, dispersed thereinto with ball mill, sand mill, high-shear fluid flow mill, Cowles Dissolver, Katy Mill or the like. The colorants also may be dispersed directly in the polymer by milling on a heated two-roll mill at about 220° F. to 360° F. (104.44° C. to 182.22° C.) and using processing aids as desired, such as solvents or plasticizers. The viscosity and printing characteristics of the ink composition may be modified further by addition of water, solvents, plasticizers, sequestered wax, surfactants and the like to suit the particular printing needs.

The ink compositions of the present invention are not limited to any type of dye, pigment, filler, or the like, all of which are hereinafter included in the term "colorant," and can accommodate any colorant which can be dispersed, milled, mixed, blended or dissolved in any manner in either the polymer blend, water or aqueous polymer system.

In accordance with the present invention, ink or varnish compositions prepared from the above polymer blends may be superior over prior aqueous ink or varnish compositions in one or more of such properties as pigment wetting, pigment stability, temperature stability (heat and freeze-thaw), nonsettling for extended periods of time, nonpolluting with respect to odor and volatile organics, nonflocculating, long "open" time in the press fountain, wide viscosity range inks, adhesion to a variety of substrates, hardness, gloss, drying rate on substrates, film-forming properties at low temperatures without organic co-solvents, resistance to grease, water and scuff, compatibility with other water-based inks, wet rub resistance, ink mileage characteristics (considerable water dilution allowable at the press), ink press stability in general, printability (clean, sharp transfer without "stringing or misting"), trapping, easy clean up, nonplugging of printing plates, flexibility, redispersibility or rewetting, crinkle resistance, solvent resistance, alkali, chemical and detergent resistance, blocking resistance, light-fastness, heat resistance, slip angle, coefficient of friction, toughness, substrate wetting, hold-out, opacity, dry-rate, and no offset on the printing press (coating e.g. on tension rollers).

The following examples will serve to further illustrate the invention, but should not be construed to limit the invention, unless expressly set forth in the appended claims. All parts, percentages, and ratios are by weight unless otherwise indicated in context.

EXAMPLES

Polymer Preparation

All of the resins set forth below were prepared by the following general procedure. The starting materials were premixed as seven separate charges in the amounts set forth below.

| | Parts by weight |
|---|---|
| CHARGE 1 | |
| Acrylic Polymer (styrenated acrylic resin, acid value: 180–220, M.W.: 6,000–10,000, 30% solids in water) | 37.80 |
| Deionized Water | 20.62 |
| Dowfax 2A1 surfactant | 0.50 |
| Ammonia (28%) | 0.20 |

11
-continued

|  | Parts by weight |
|---|---|
| CHARGE 2 | |
| Ammonium Persulfate initiator | 0.35 |
| Deionized Water | 1.49 |
| CHARGE 3 | 34.45 |
| Monomers | |
| CHARGE 4 | 3.75 |
| Acrylic Polymer (same as above) | |
| CHARGE 5a | 0.23 |
| Tert-Butylhydroperoxide | |
| CHARGE 5b | |
| Sodium Ascorbate | 0.11 |
| Deionized Water | 0.40 |
| CHARGE 6 | 0.10 |
| Biocide (Tektamer 38AD, Calgon Corp.) | |
| Total | 100.00 |

The polymers were then prepared by the following steps. Blanket the reactor with nitrogen and add charge 1. Heat Charge 1 in the reactor to 88° C. Pump 10% of Charge 3 from monomer tank into the reactor. Add Charge 2 to the reactor and continue mixing for 30 minutes at 88° C. Meter the remaining Charge 3 from the monomer tank into the reactor over a 70 minute period at 88° C. and hold for 1 hour at 88° C. Add Charge 4 to the reactor after 80% of the monomer has reached the reactor. Add Charge 5a to the reactor and mix for 5 minutes. To the reactor add one-third of 5b, mix for 5 minutes, add another one-third of 5b, mix for another 5 minutes, add the last one-third of 5 b and mix for an additional five minutes. Cool to 49° C. Pump Charge 6 into reactor and mix for 15 minutes.

Varnish Preparation

All of the polymers were used to prepare a varnish by simple mixing of 91 parts by weight of the product of the polymerization with a 9 parts by weight of a coalescent agent, ethylene glycol propyl ether.

Coating Procedures and Tests

The varnishes were diluted with water to a composition having a viscosity of 20 to 22 seconds on a #2 Zahn cup and the diluted composition was printed with a Line Screen 180 hand proofer. The coatings were then tested immediately (for "green slide angle") or allowed to dry overnight (for all other tests).

Wet block resistance is tested by putting two overnight dried coated pieces of stock (paper) together coating-to-coating in an oven with a specific weight placed on top of the papers. The weight is usually 1 lb per square inch, and the samples were in the 60° C. oven for at least 18 hours. To make this procedure for testing 'wet block resistance', water is introduced in one of several ways. The first way is with one drop of water between the coated surfaces and the second way is where the entire set up is placed in 70% R.H. humidity chamber. After an amount of time, the samples are removed from the oven/weights and pulled apart immediately. When pulling apart, there should be no paper tear and very little "cling". Each sample was then rated on a scale from 1–10 for tearing apart and cling. (A '1' is complete block and '10' the samples fell apart. Each data point represents an average of 10 individual samples each consisting of two 1"×1" coated papers placed coating-to-coating (face-to-face=F/F) under a 1 lb/sq. inch for 20 hours at 60° C.

The coatings were evaluated for gloss by conventional means, i.e. simply measuring within a Macbeth Novo-Gloss Meter the percent of visible light reflected from the surface at the same angle (i.e. 60%) as the incident angle of the light.

12

The values expressed below are the percent of light reflected for an average of seven measurements.

Slide angle is a measure of the coefficient of friction on the surface of the coating. The values for the slide angles are reported in both 'Green' and 'Aged' angles. This is because different end-use application sites may test the coefficient of friction at the press during a run (Green slide angle-no over night drying) or at a much later date after the run. (Aged slide angle-dried over night). Slide Angle is reported in degrees (θ). Coefficient of Friction is the tangent of the slide angle (Tan θ).

EXAMPLES 1–4 AND COMPARATIVE EXAMPLE A

Polymers were prepared by the procedure set forth above using a monomer blend of 2-ethylhexyl acrylate (EHA), methyl methacrylate (MMA), and one of following three multi-ethylenic monomers: divinyl benzene (ME1), an aliphatic urethane acrylate (ME2), available as Photomer® 6210, or bisphenol A ethoxylate diacrylate (ME3) available as Photomer® 4028, UV curing agent from Henkel Corporation, Ambler, Pa. in the amounts (in parts by weight) shown in Table 1. Each polymer was made into a varnish, printed on paper stock, and the printed film was evaluated, all as set forth above. The results are shown in Tables 2–4, wherein the "Δ%" value is the percent difference in the corresponding value of Comparative Example A.

TABLE 1

| Example | EHA (pbw) | MMA (pbw) | ME1 (pbw) | ME2 (pbw) | ME3 (pbw) |
|---|---|---|---|---|---|
| A | 19.65 | 14.80 | 0 | 0 | 0 |
| 1 | 19.55 | 14.70 | 0.2 | 0 | 0 |
| 2 | 19.45 | 14.60 | 0.4 | 0 | 0 |
| 3 | 19..45 | 14.60 | 0 | 0.4 | 0 |
| 4 | 19.25 | 14.40 | 0 | 0.8 | 0 |
| 5 | 19.45 | 14.40 | 0 | 0 | 0.4 |

TABLE 2

| | Wet Block Resistance on Beer carton stock | | Wet Block Resistance on Pet Food Bag Stock | |
|---|---|---|---|---|
| Example | (rating) | (Δ %) | (rating) | (Δ %) |
| A | 2.3 | — | 3.6 | — |
| 1 | 3.6 | +36.11 | 5.8 | +37.93 |
| 2 | 8.6 | +73.26 | 4.4 | +18.18 |
| 3 | 4.6 | +50.00 | 4.0 | +10.00 |
| 4 | 4.3 | +46.51 | 4.6 | +21.74 |
| 5 | 4.3 | +46.51 | 3.5 | +14.29 |

TABLE 3

| | Gloss on Black Leneta Chart | | Gloss on White Leneta Chart | |
|---|---|---|---|---|
| Example | (%) | (Δ %) | (%) | (Δ %) |
| A | 73.0 | — | 62.3 | — |
| 1 | 64.7 | −12.83 | 54.2 | −14.94 |
| 2 | 70.7 | −.97 | 63.4 | +0.14 |
| 3 | 72.3 | −.97 | 62.7 | +.64 |
| 4 | 72.8 | −.27 | 66.3 | +0.6 |
| 5 | 63.6 | −14.78 | 5.6.3 | −10.66 |

TABLE 4

| Example | Slide Angle (Green) on Pet Food Bags θ° | Slide Angle (Green) on Pet Food Bags Δ % | Slide Angle (Aged) on Pet Food Bags θ° | Slide Angle (Aged) on Pet Food Bags Δ % | Slide Angle (Green) on Beer Carton Stock θ° | Slide Angle (Green) on Beer Carton Stock Δ % | Slide Angle (Aged) on Beer Carton Stock θ° | Slide Angle (Aged) on Beer Carton Stock Δ % |
|---|---|---|---|---|---|---|---|---|
| A | 43.7 | — | 36.7 | — | 37.0 | — | 36.3 | — |
| 1 | 46..7 | +6.42 | 46.7 | +16.59 | 38.0 | +2.63 | 35 | 3.71 |
| 2 | 47.6 | +8.19 | 40.6 | +15.24 | 37.0 | 0.0 | 36.3 | 0.0 |
| 3 | 44.7 | +2.24 | 40.6 | +9.61 | 40.3 | +8.19 | 35.7 | −1.68 |
| 4 | 40.7 | −7.37 | 39.7 | +7.56 | 40.5 | +8.6 | 34.3 | −3.83 |
| 5 | 40.3 | −8.44 | 44.7 | +17.90 | 36.3 | −1.93 | 34.7 | −4.61 |

What is claimed is:

1. A method of coating a substrate comprising:
   (i) contacting a surface of a substrate with a composition comprising a polymer prepared by polymerizing a blend of monomers, said blend consisting essentially of:
      (i) a plasticizing amount of from about 40 to about 60% by weight of the monomer blend, of a monomer selected from the group consisting of plasticizing alkyl acrylate monomers and mixtures thereof,
      (ii) a hardening amount of from about 35 to about 55% by weight of the monomer blend, of a monomer selected from the group consisting of hardening alkyl (meth) acrylate monomers and mixtures thereof, and
      (iii) a crosslinking amount of from about 0.01 to less than about 5% by weight of the monomer blend, of a monomer selected from the group consisting of multi-ethylenically unsaturated monomers and mixtures thereof,
   in an aqueous medium comprising a polymer component consisting essentially of a water-soluble, acrylic polymer having carboxylate functionality, and
   (ii) drying said surface to form a film of said polymer in contact with said surface.

2. The method as claimed in claim 1 wherein said plasticizing monomer is an alkyl acrylate, comprising at least one alkyl acrylate selected from the group consisting of straight chain alkylacrylates having from 3 to 11 carbon atoms in the alkyl group and branched chain alkyl acrylates having from 5 to 11 carbon atoms in the alkyl group.

3. The method as claimed in claim 1 wherein said plasticizing alkyl acrylate monomer comprises at least one alkyl acrylate selected from the group consisting of n-propyl acrylate, n-butyl acrylate, isobutyl acrylate, n-hexyl acrylate, 2-ethylbutyl acrylate, 2-heptyl acrylate, and 2-ethylhexyl acrylate.

4. The method as claimed in claim 1 wherein said hardening alkyl (meth)acrylate monomer is an alkyl methacrylate, comprising at least one alkyl methacrylate selected from the group consisting of alkyl methacrylates having from 1 to about 4 carbon atoms in the alkyl group.

5. The method as claimed in claim 1 wherein said hardening monomer comprises at least one alkyl methacrylate selected from the group consisting of methyl methacrylate, ethyl methacrylate, isopropyl methacrylate, sec-butyl methacrylate, isobutyl methacrylate, and t-butyl methacrylate.

6. The method as claimed in claim 1 wherein said multi-ethylenically unsaturated monomer comprises at least one monomer selected from the group of consisting of di-alkenyl arenes, polyol diacrylates, and urethane oligomer diacrylates.

7. The method as claimed in claim 1 wherein said multi-ethylenically unsaturated monomer is divinylbenzene.

8. A method as claimed in claim 1 wherein said multi-ethylenically unsaturated monomer is present in an amount of from about 0.1% to about 1.0% by weight of the monomer blend.

9. A method as claimed in claim 1 wherein said blend of monomers consists essentially of plasticizing alkyl acrylate monomers in an amount from about 50% to about 60% by weight, hardening alkyl (meth) acrylate monomers in an amount from about 40% to about 50% by weight, and a crosslinking monomer in an amount from about 0.1% to about 2% by weight.

10. The method as claimed in claim 1 wherein:
   the plasticizing monomer, comprises at least one alkyl acrylate selected from the group consisting of n-propyl acrylate, n-butyl acrylate, isobutyl acrylate, n-hexyl acrylate, 2-ethylbutyl acrylate, 2-heptyl acrylate, and 2-ethylhexyl acrylate, in an amount from about 50% to about 60% by weight,
   the hardening monomer, comprises at least one alkyl methacrylate selected from the group consisting of methyl methacrylate, ethyl methacrylate, isopropyl methacrylate, sec-butyl methacrylate, isobutyl methacrylate, and t-butyl methacrylate, in an amount from about 40% to about 50% by weight, and
   wherein the multi-ethylenically unsaturated monomer comprises at least one monomer selected from the group consisting of dialkenyl arenes, polyol diacrylates and urethane oligomer diacrylates, in an amount from about 0.1% to about 2% by weight.

11. The method as claimed in claim 10 wherein said plasticizing monomer is 2-ethylhexyl acrylate, said hardening monomer is methyl methacrylate and said multi-ethylenically unsaturated monomer is divinylbenzene.

12. The method as claimed in claim 1 wherein said water soluble acrylic polymer having carboxylate functionality and said polymer formed from the monomer blend is present in a ratio by weight of the polymer formed from the monomer blend to the water-soluble acrylic polymer of from about 5.0:1 to about 1.5:1.

13. The method as claimed in claim 1 wherein said water soluble, acrylic polymer having carboxylate functionality and said polymer formed from the monomer blend are present in a ratio by weight of the polymer formed from the monomer blend to the water-soluble acrylic polymer of from about 3.0:1 to about 2.5:1.

14. The method as claimed in claim 1 wherein said water-soluble acrylic polymer having carboxylate functionality is a styrene/acrylic copolymer having an acid number of about 150 to about 250.

15. The method as claimed in claim 1 wherein said acrylic polymer has an acid number of 180 to 220.

16. The method as claimed in claim 1 wherein said carboxylate functionality is unreacted and uncomplexed.

17. The method as claimed in claim 1 wherein said substrate is a non-woven, cellulosic substrate.

* * * * *